United States Patent [19]

Sedlmayr

[11] Patent Number: 4,950,357
[45] Date of Patent: Aug. 21, 1990

[54] APPARATUS FOR MAKING LIGHT TRANSFER DEVICES

[75] Inventor: Steven R. Sedlmayr, Golden, Colo.

[73] Assignee: Advance Display Technologies, Inc., Boulder, Colo.

[21] Appl. No.: 273,235

[22] Filed: Nov. 18, 1988

Related U.S. Application Data

[63] Continuation of Ser. No. 25,282, Mar. 12, 1987, abandoned, which is a continuation-in-part of Ser. No. 575,816, Feb. 1, 1984, Pat. No. 4,650,280.

[51] Int. Cl.$^5$ .............................................. G02B 6/06
[52] U.S. Cl. .................................. 156/426; 156/174; 350/96.25
[58] Field of Search ............... 156/174, 426, 172, 169, 156/425, 433, 441; 350/96.21, 96.15, 96.25, 96.10, 96.27, 96.24; 65/10.2

[56] References Cited

U.S. PATENT DOCUMENTS

| | | | |
|---|---|---|---|
| 3,544,406 | 12/1970 | McAllister | 156/174 |
| 3,644,922 | 2/1972 | James et al. | 350/96.24 X |
| 3,772,119 | 11/1973 | Peck | 156/174 X |
| 3,871,591 | 3/1985 | Murata | 156/174 X |
| 3,954,546 | 5/1976 | Aurenz | 156/174 X |
| 4,129,468 | 12/1978 | Knab | 156/172 |
| 4,208,096 | 6/1980 | Glenn, Jr. | 350/96.25 |
| 4,650,280 | 3/1987 | Sedlmayr | 350/96.27 |
| 4,737,215 | 4/1988 | Stoffels et al. | 156/426 X |
| 4,743,080 | 5/1988 | Sakakibara et al. | 350/96.24 |

FOREIGN PATENT DOCUMENTS

| | | | |
|---|---|---|---|
| 0012901 | 12/1979 | European Pat. Off. | 350/96.21 |
| 60-22104 | 2/1985 | Japan | 65/10.2 |

Primary Examiner—Michael W. Ball
Assistant Examiner—Jeff H. Aftergut
Attorney, Agent, or Firm—Fields, Lewis, Pittenger & Rost

[57] ABSTRACT

A method and apparatus for making fiber optic light transfer devices has apparatus to continuously supply a selected number of optical fibers, apparatus to form those fibers into a ribbon and adjust to different wrapping radii of a wrapper. The wrapper is in the form of a rotary wheel on which there is mounted a matrix former and a spaced ribbon former. The end of the ribbon is clamped to the rotary wheel and as the wheel is rotated successive wraps of ribbon are made on aligned U-shaped support surfaces of the formers. A separator is positioned between each ribbon layer in the matrix former and a channel-shaped locator element is positioned on the spaced ribbon former before each ribbon layer is wrapped thereon. A reflective glue is added to the layers in both formers. A clamp clamps the wrapped layers in each former after which they are cured in an oven. The two matrix portions and two spaced ribbon end portions so formed are supported in fixtures and cut preferably by a band saw blade to form two light transfer devices.

6 Claims, 8 Drawing Sheets

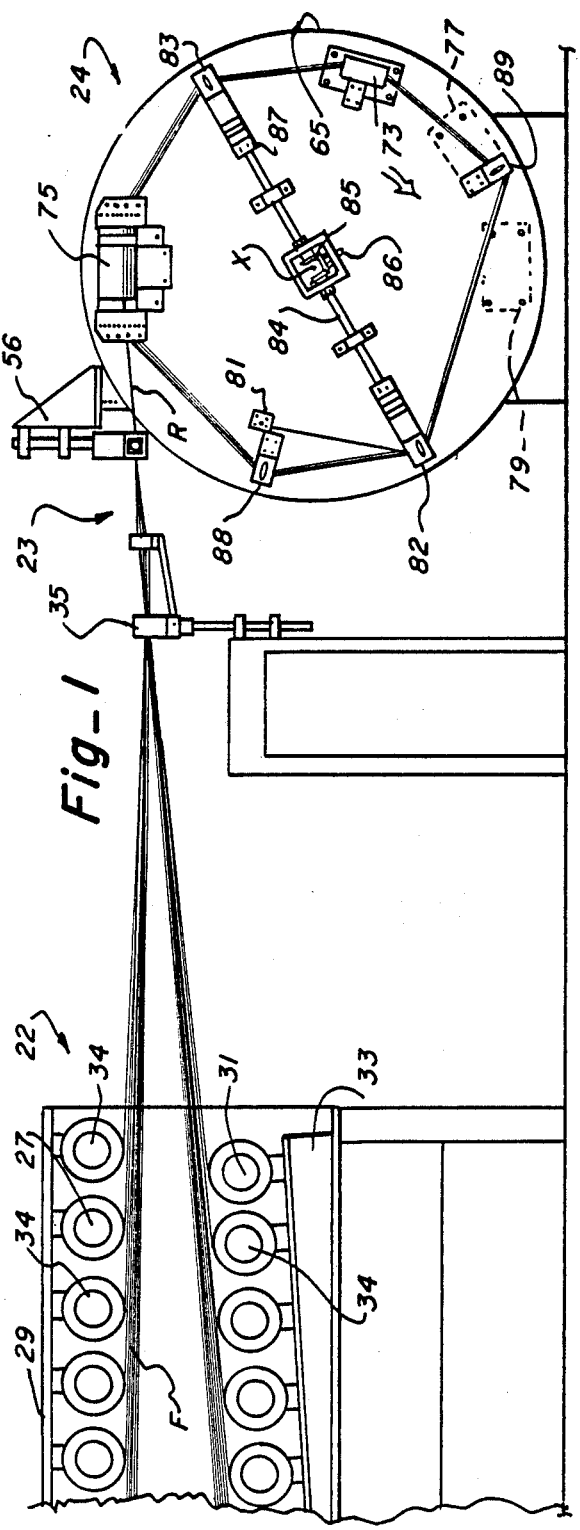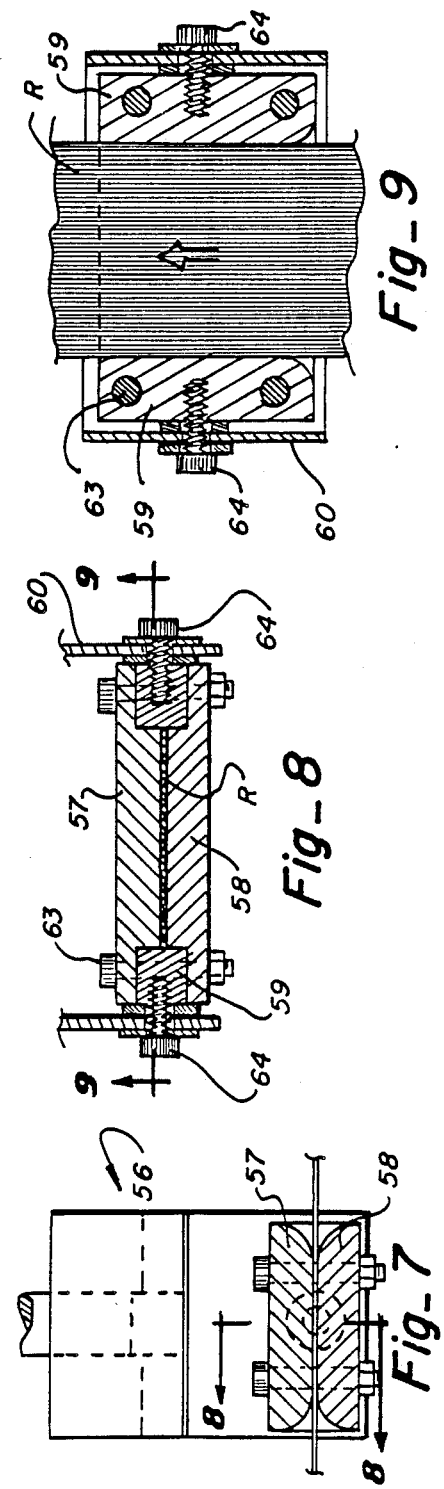

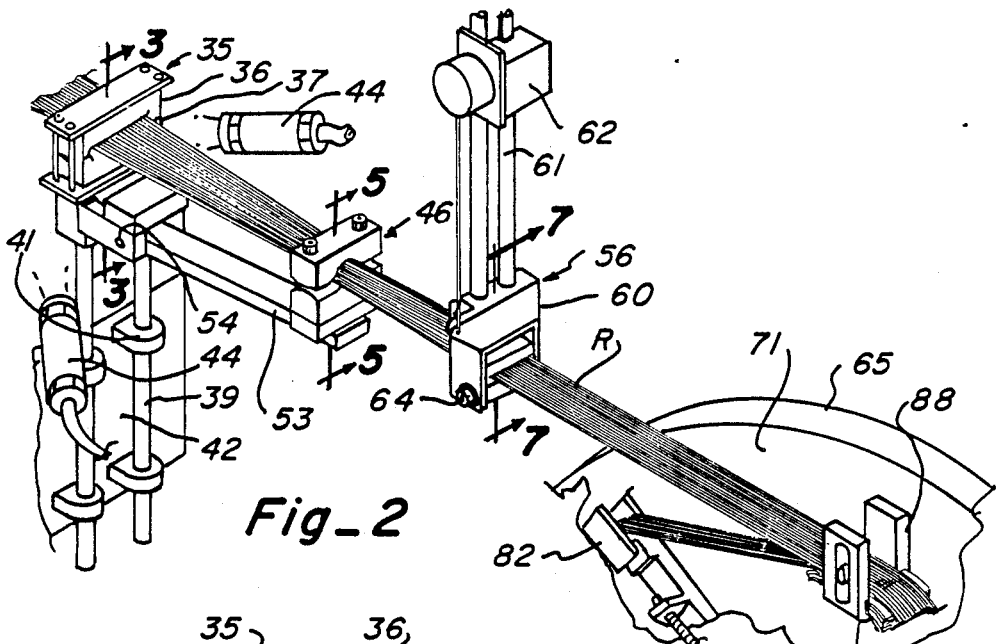
Fig_2
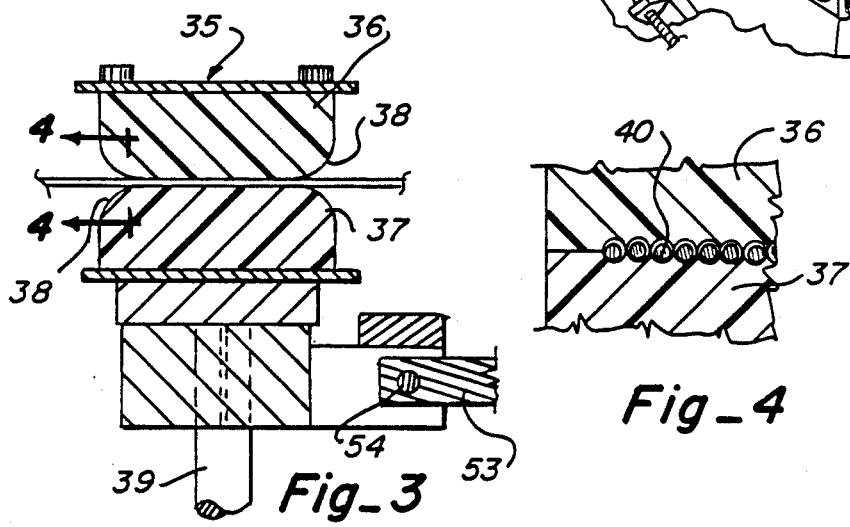
Fig_3
Fig_4
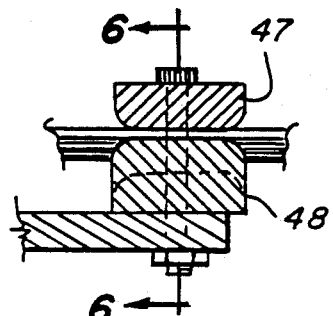
Fig_5
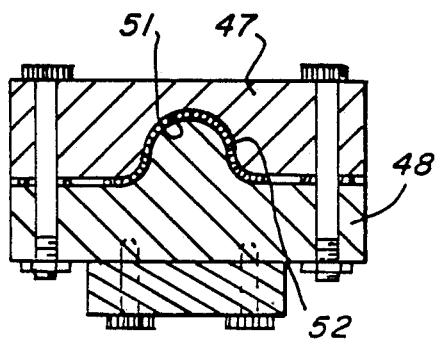
Fig_6

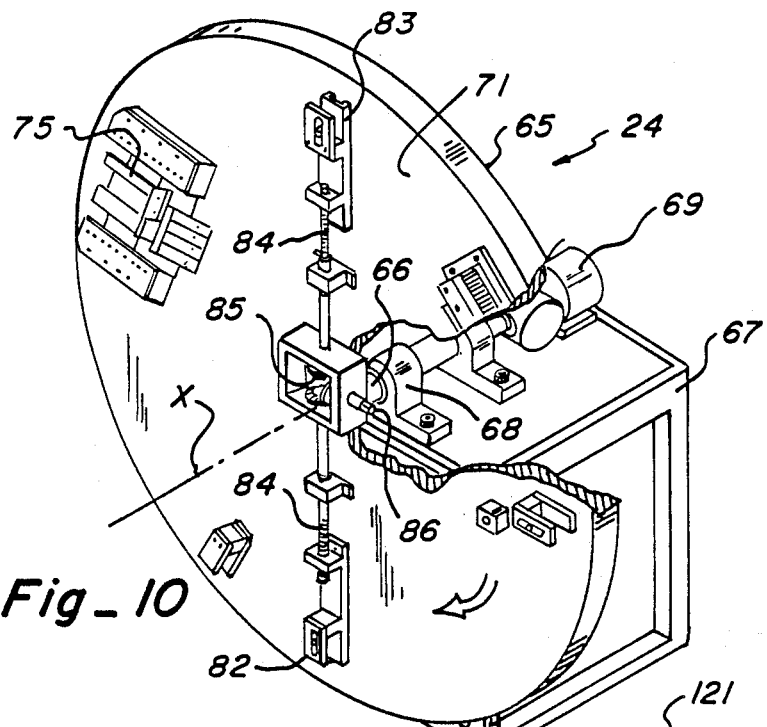
Fig_10
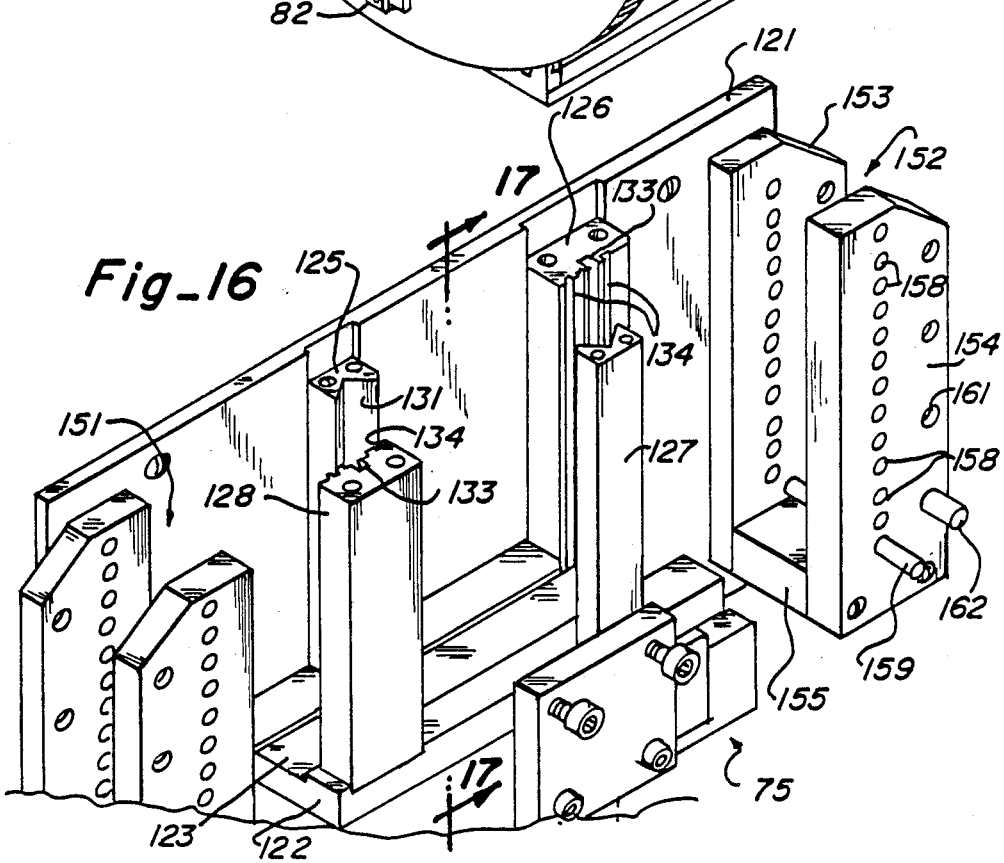
Fig_16

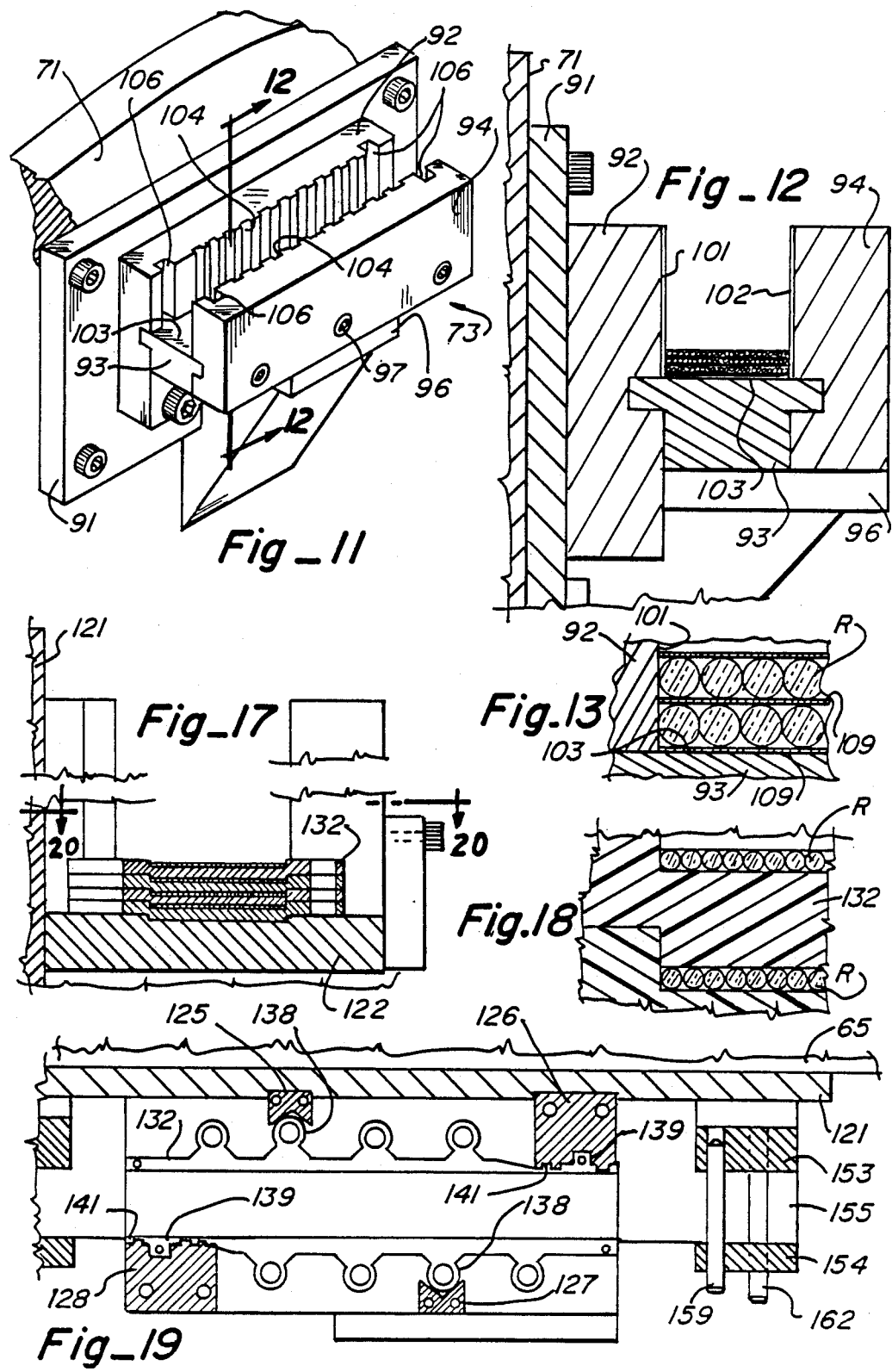

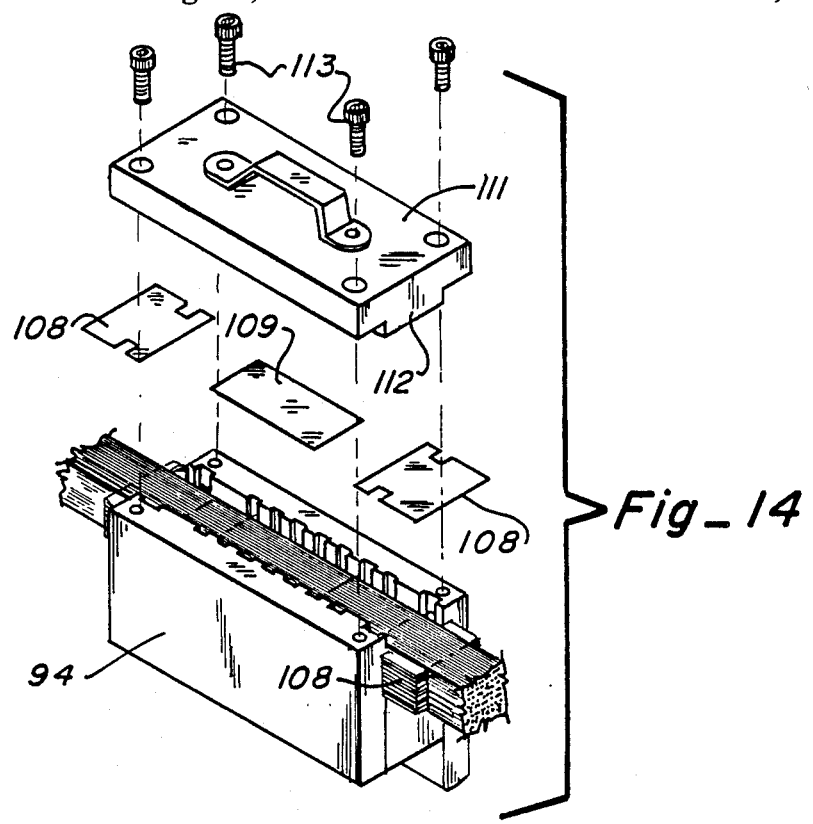
Fig_14
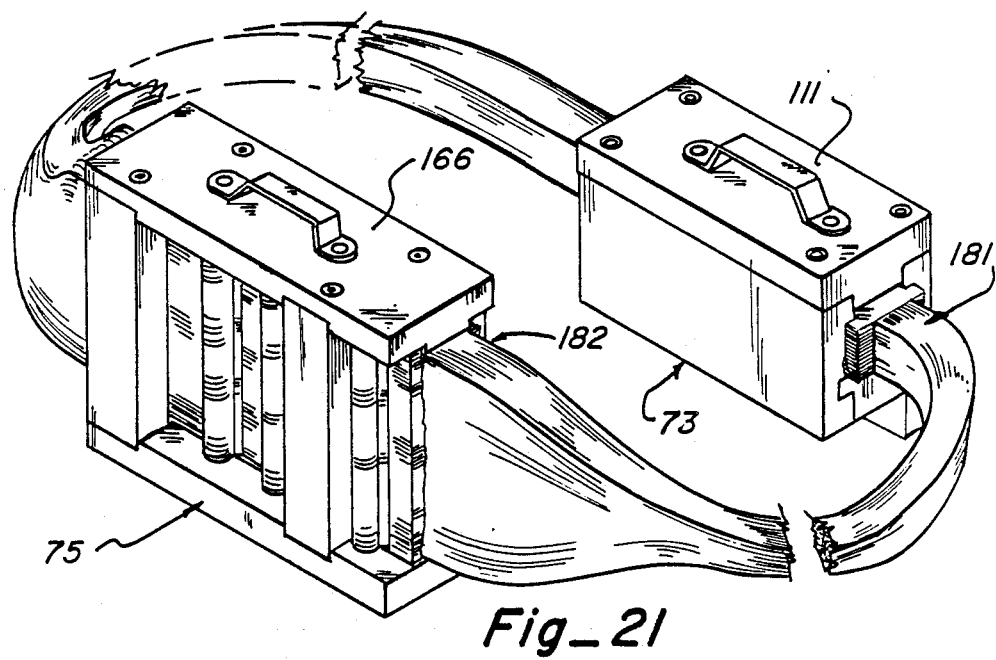
Fig_21

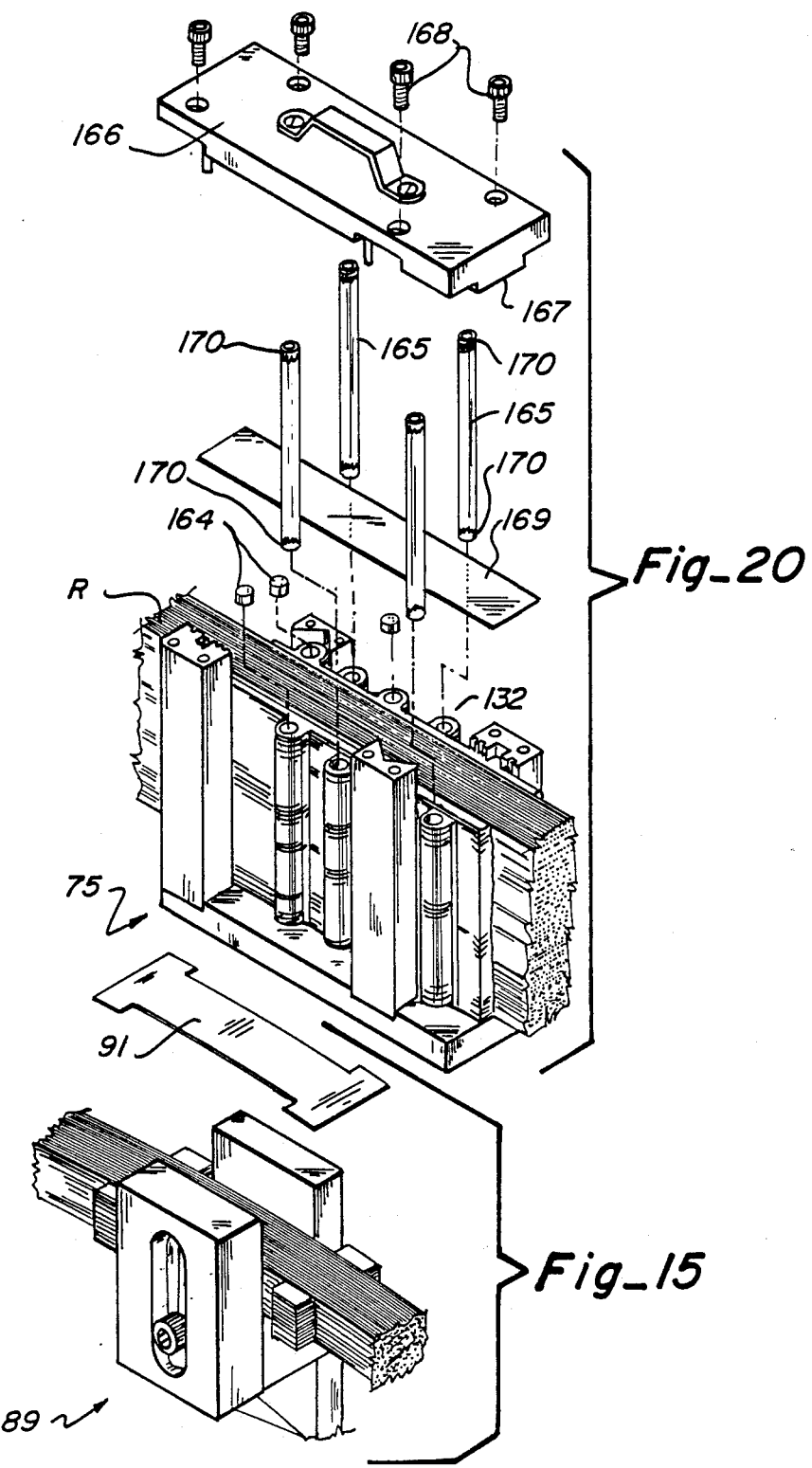

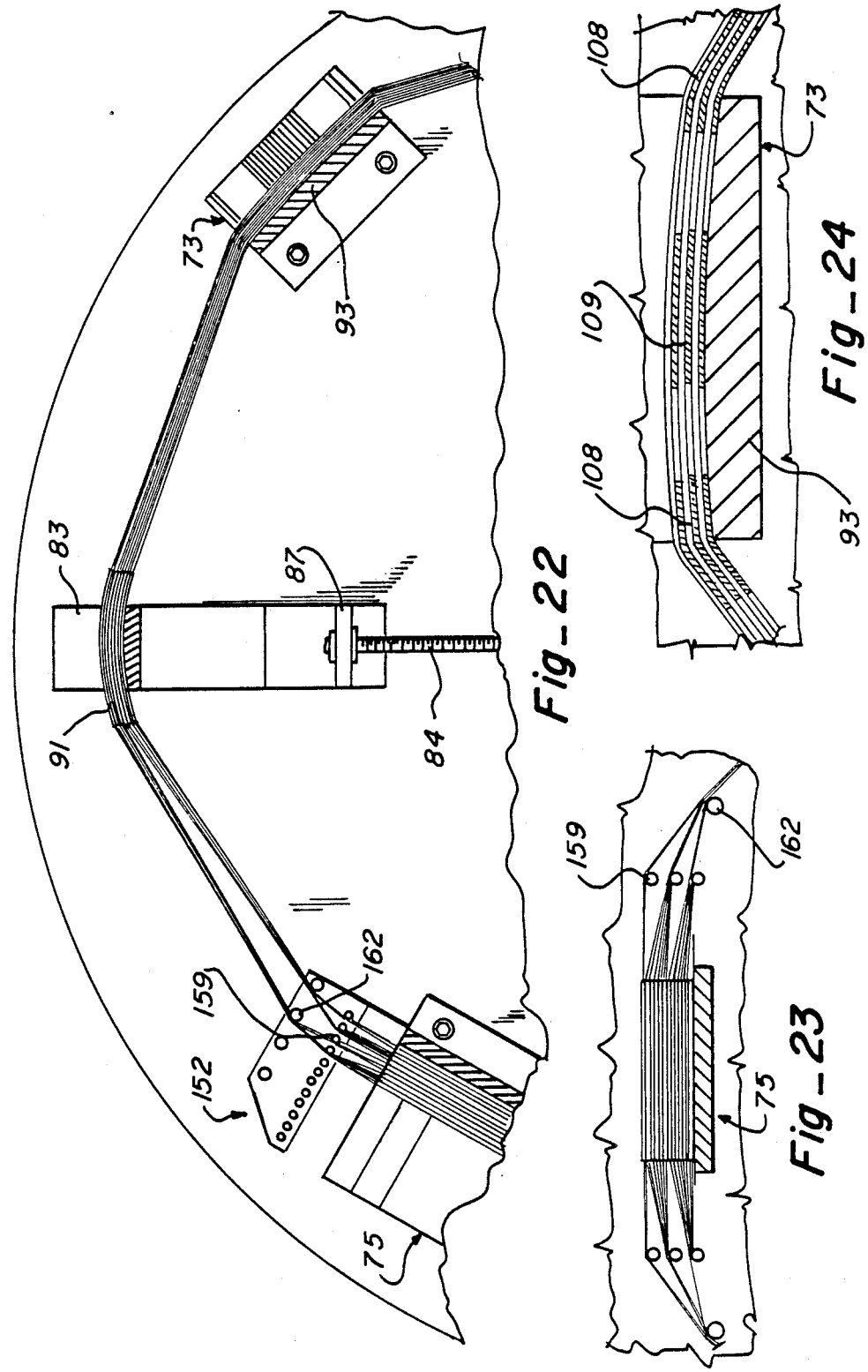

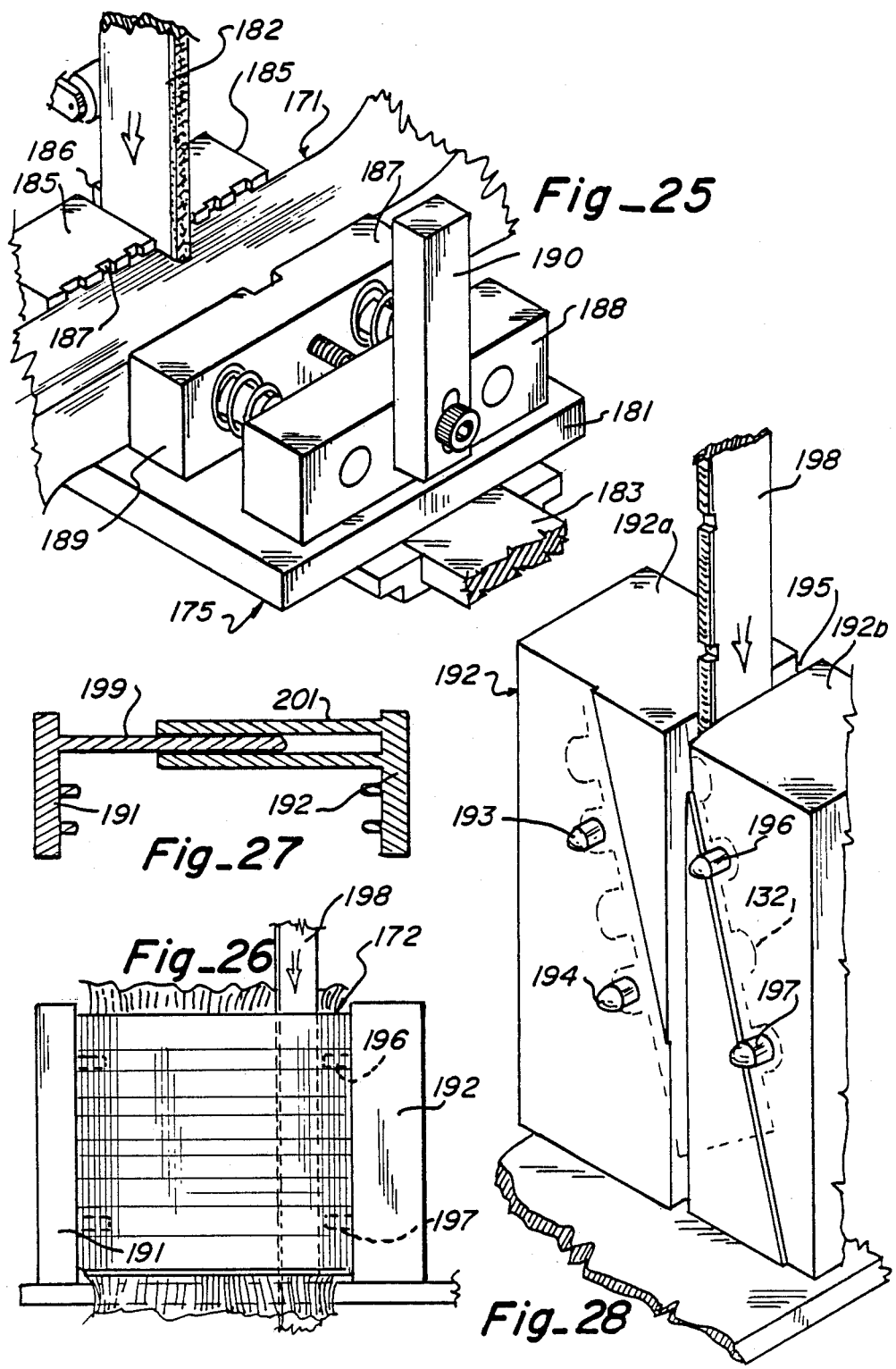

APPARATUS FOR MAKING LIGHT TRANSFER DEVICES

This application is a continuation of application Ser. No. 025,282, filed Mar. 12, 1987 now abandoned, which is a continuation-in-part of application Ser. No. 575,816 filed Feb. 1, 1984 now U.S. Pat. No. 4,650,280.

TECHNICAL FIELD

This invention relates to a novel method and apparatus for making fiber optic light transfer devices using a continuous weaving process.

BACKGROUND ART

The prior art fiber optical light or image transfer devices in general have been relatively complicated to manufacture, cumbersome, space consuming and economically prohibitive for widespread commercial use. The prior art has recognized the need for accurately locating and alining each fiber in an array but the relatively small size of each fiber and the brittleness thereof make this difficult.

Hicks U.S. Pat. No. 3,043,910 uses relatively thin flat spacer strips inclined at an angle to the lengthwise extent of the fibers and therefore lacks a disclosure for accurately locating and holding the fibers in precise location to one another in each of three planes that are perpendicular to one another. The particular problem that is not solved by Hicks is the tendency for one ribbon to skew, squirrel or twist relative to the other along the length of the fibers.

Glenn U.S. Pat. Nos. 4,116,739 and 4,208,096 attempt to solve the problem of accurate alinement and locating of the fibers in relation to one another by using a spirally wound construction. This approach, however, does not both accurately locate and hold the fibers in the three mutually perpendicular planes above discussed.

Further deficiency in the above discussed prior art is the lack of a satisfactory construction for expanding a basic light transfer unit to larger size units without sacrificing the resolution.

DISCLOSURE OF THE INVENTION

An apparatus and method for making fiber optic light transfer devices is disclosed which includes a fiber supply that continuously supplies a selected number of optical fibers, a series of die sets that bring the fibers into a ribbon and a ribbon wrapper that lays down a succession of ribbon layers onto two formers. The ribbon wrapper has a support wheel with a planar support surface on which there is mounted a matrix former providing U-shaped support surfaces for forming the ribbon for the matrix end and a spaced ribbon former providing U-shaped support surfaces for forming the ribbon and locator bodies. The two formers are positioned a selected distance from the axis of the wheel and a selected distance apart so that as the wheel is rotated ribbon delivered from the supply under tension successively wraps the ribbon on the matrix former and then on the spaced ribbon former. During each revolution a reflective glue is applied and a separator is placed between each ribbon portion disposed in the matrix former to form two matrix portions A locator element is placed on the spaced ribbon former and a ribbon layer and a reflective glue is laid down in each revolution. Temporary spacers are used at the ends of the matrix former and on ribbon guides on each side of the matrix former. The two spaced ribbon portions and the two matrix portions so formed are clamped against the U-shaped support surfaces and the two are cured in a suitable heating oven. The two spaced ribbon portions are terminated as by cutting along a plane at an angle to the fiber ribbon and the two matrix end portions are terminated as by cutting along a plane transverse to the fiber ribbon as by cutting with a saw blade to form two light transfer devices.

BRIEF DESCRIPTION OF THE DRAWINGS

FIG. 1 is a side elevation view of apparatus for making light transfer devices embodying features of the present invention.

FIG. 2 is a perspective view of the ribbon former shown in FIG. 1.

FIG. 3 is a sectional view taken along lines 3—3 of FIG. 2.

FIG. 4 is a sectional view taken along lines 4—4 of FIG. 3.

FIG. 5 is a sectional view taken along lines 5—5 of FIG. 2.

FIG. 6 is a sectional view taken along lines 6—6 of FIG. 5.

FIG. 7 is a sectional view taken along lines 7—7 of FIG. 2.

FIG. 8 is a sectional view taken along lines 8—8 of FIG. 7.

FIG. 9 is a sectional view taken along lines 9—9 of FIG. 8.

FIG. 10 is a perspective view of the wrapper shown in FIG. 1.

FIG. 11 is a perspective view of the matrix former shown in FIG. 1 without the clamping cap.

FIG. 12 is a sectional view taken along lines 12—12 of FIG. 11 with several fiber ribbon layers and separators shown disposed thereon.

FIG. 13 is an enlarged sectional view of FIG. 12 at the lower left boundary of the former and ribbon interface.

FIG. 14 is an exploded view of the matrix former with the clamping cap removed.

FIG. 15 is an enlarged view of one of the guides for the fiber ribbon.

FIG. 16 is a perspective view of the spaced ribbon former shown in FIG. 1.

FIG. 17 is a sectional view taken along lines 17—17 of FIG. 16 with several layers of ribbons and locator elements in place.

FIG. 18 is an enlarged fragmentary sectional view of FIG. 17 at the lower left boundary between locator elements.

FIG. 19 is a sectional view taken along lines 19—19 of FIG. 17.

FIG. 20 is an exploded view of the spaced ribbon former with several layers of ribbons and locator elements in place.

FIG. 21 is a perspective view of a fiber bundle having two matrix portions formed in the matrix former and two spaced ribbon portions formed in the spaced ribbon former with associate clamping caps in place.

FIG. 22 is a side elevation view of the ribbon being wrapped on the formers and on a guide between the formers.

FIG. 23 is a side elevation view of the ribbon being wrapped on the spaced ribbon former.

FIG. 24 is a side elevation view showing the ribbon being wrapped on the matrix former.

FIG. 25 is a perspective view showing the fixture and saw blade for cutting of two formed matrix portions into two parts.

FIG. 26 is a side elevation view showing the fixture and saw blade for cutting of two formed spaced ribbon portions into two parts.

FIG. 27 is a schematic of a top view of the fixture shown in FIG. 26.

FIG. 28 is a fragmentary perspective view of one end clamp of the fixture shown in FIG. 26.

DETAILED DESCRIPTION

In the parent U. S. Patent Application Ser. No. 575,816 there is disclosed a light transfer device in which end portions of a bundle of optical fibers arranged as a series of parallel spaced fiber ribbons are positioned in a locator body made up of a plurality of channel-shaped locator elements providing spacers between ribbons in which fiber ribbons and spacers are alternated and the ribbons are held against relative movement in three mutually perpendicular planes to form two spaced ribbon portions and two matrix portions. The two spaced ribbon portions are terminated at an angle to the plane of the ribbons as by cutting to form two spaced ribbon end surfaces which will serve as a display surface for an image. The opposite end portions of the fiber ribbons are brought together into an array of rows and columns to form two matrix end surfaces.

In the method for making the light transfer device described in the above-mentioned parent application an adhesive is placed on the inside surfaces of the channel-shaped locator element, a fiber ribbon is placed on these inside channel-shaped surfaces which serve to hold the fiber ribbon in place. The locator element has parallel spaced flanges along the top and parallel spaced notches in the bottom so that when a second locator element is placed on a first locator element there is a nesting of one element within another with an intermediate spacer portion pressing down on the top of the fiber ribbon and forming a slot. Succeeding locator elements are stacked one on the other until the desired stack is achieved. The depth of the stack establishes the lateral extent of the locator body.

The fiber ribbons secured in the locator body so formed are cut down through the stack along a plane that is 90 degrees to the plane of the fiber ribbon and at an angle to the fibers to define an end surface with the cut fiber ends. This method provides two identical light transfer devices. The cut angle is sharp to provide greater surface area. This angle is between 8 degrees to 10 degrees to the axis of the fibers.

The apparatus shown in FIG. 1 for making light transfer devices in general includes a fiber supply 22, a ribbon former 23, and a ribbon wrapper 24. The fiber supply 22 shown includes an upper row of spaced spools 27 each wound with an optical fiber F with each spool being mounted on an upper support frame 29 and a lower row of spaced spools 31 each wound with an optical fiber with each spool being mounted on a lower support frame 33. The upper and lower frames and associated spool rows diverge toward one another toward a downstream discharge end so that an individual fiber F is unwound from the spool when a pulling force is applied from a common area downstream of the spools without becoming entangled. A brake 34, preferably an air brake, is associated with each spool to put a drag on the spool so each fiber is pulled under tension as each is unwound from each spool.

The optical fibers F drawn from the spools are first passed through a fiber converger 35 as seen in FIGS. 2 and 3 which includes an upper die 36 and lower die 37 which serves to converge the fibers into a loose ribbon with some space between adjacent fibers. The upper and lower dies are generally channel-shaped and the openings in the channels face one another so that side walls thereof limit or confine the width of the fibers as they pass therethrough. The forward and rear edges of the base of the channels 38 are rounded so the fibers will pass freely therethrough. Moreover, grooves 40 as seen in FIG. 4 are provided in each horizontal face of the dies to guide the fibers. These dies are mounted on a pair of upright shafts 39 that slide in bearings 41 on a suitable support 42 to enable the dies to move up and down. A pair of anti-static electricity devices 44 are mounted to direct an output against the fibers as they pass through the dies to neutralize any static charge on the moving fibers.

A ribbon former 46 as shown in FIGS. 2, 5 and 6 downstream of converger 35 includes upper die 47 and lower die 48 that brings the fibers into a close ribbon of the desired width with substantially no space between adjacent fibers. In an illustrative example the fiber ribbon through the first set of dies 36 and 37 would be two inches wide and through the second set the ribbon width would be one inch. The upper die 47 has a concave surface 51 formed on radius and has rounded corners so as to be generally in the form of a parabola. The lower die has a convex surface 52 that is complementary in shape to the upper die and these curved surfaces providing a small gap therebetween serve to prevent uneven spacing between fibers and provides a guide with substantially no friction. Dies 47 and 48 are mounted on an arm 53 that pivots freely up and down about horizontal pivot 54 at the structure supporting dies 36 and 37 to allow these dies 47 and 48 to adjust in elevation to accomodate to different wrapping radii on the succeeding wrapper 24.

From converger 46 as shown in FIGS. 2, 7, 8 and 9 the fiber ribbon is then passed through a pivoted die set 56 including an upper die 57 and a lower die 58 having parallel spaced guide surfaces and a pair of spaced side dies 59 having parallel spaced guide surfaces. This die set is mounted on an inverted channel-shaped frame 60 supported by a pair of depending rods 61 which are free to move up and down in holes in a suitable overhead support 62. The upper and lower dies 57 and 58 have opposed notches in opposite inside surfaces into which the side dies 59 fit and bolt fasteners 63 secure these dies together. A pivot bolt 64 extends through each depending side arm of frame 60 into a side die on both sides of the die set to mount them for rotating in either direction about a transverse horizontal axis to enable the die set to adjust to different wrapping radii on the wrapper 24.

The wrapper 24 shown as seen in FIGS. 1 and 10 includes a flat-sided support wheel or disk 65 supported for rotation about a horizontal axis x by a drive shaft 66 mounted on a support frame 67 in a pair of spaced bearing journals 68. A drive 69 rotates the shaft to turn the support wheel preferably at a selected constant speed of relatively low rpm. The support wheel has a planar support surface 71 on which there is mounted a matrix former 73 and a spaced ribbon former 75 which are a selected distance apart which distance determines the length of the fiber bundle of each light transfer device being made. The matrix former 73 is movable to different distances away from the spaced ribbon former to provide different fiber bundle lengths according to the position the spaced ribbon end is located in relation to the matrix end on a final screen assembly. Two other positions for the matrix former are indicated in dashed lines at 77 and 79 on FIG. 1. The position 79 for the matrix former which is diametrically opposite the spaced ribbon former provides a bundle of fibers of maximum length whereas the position for matrix former shown in full lines is for having one bundle of fibers of minimum length while the other bundle is of maximum length. It is understood that the mounting position for the matrix former could be varied along a selected radius on the wheel and could be affixed at any selected point to provide a fiber bundle any length desired.

A ribbon clamp 81 is mounted on the support wheel in alignment with the formers. The end of the ribbon R is secured to the clamp to fasten it to the support wheel for the continuous wrapping of the ribbon on the formers as the wheel is rotated. A pair of oppositely disposed retractable ribbon guides 82 and 83 are also mounted on the support wheel on which the ribbon is also wrapped. These ribbon guides are disposed at positions generally between the two formers. Each of the retractable ribbon guides are mounted on the end of an associated threaded rod 84. The threaded rods extend radially out in opposite directions from the center or axis x of the wheel. A drive using beveled gears 85 and a common drive shaft 86 is used to rotate the rods 84 and each rod is threaded into an internally threaded block 87 on the associated ribbon guide to move the guide radially so that after the layers of ribbon are wrapped in the formers these guides are movable radially inwardly by rotating the rod to release the tension on the bundle of fibers.

A fixed ribbon guide 88 is mounted on the support wheel between the spaced ribbon former 75 and retractable guide 82 and another fixed ribbon guide 89 is mounted between retractable ribbon guide and the matrix former for further supporting the bundle of fibers in a generally circular manner wrapping about the center axis x. In sequence as the wheel 65 is rotated in a clockwise direction the ribbon R moves over the retractable guide 82, the fixed guide 89, the matrix former 73, the retractable guide 83, the spaced ribbon former 75 and the fixed guide 88.

Referring now to FIGS. 11-15 the matrix former 73 shown includes a flat support plate 91 bolted to the planar support surface 71, an inner side wall member 92 bolted to the support plate, a base member 93 connected along one side to the side wall member 92 and extending perpendicular thereto and an outer side wall member 94 connected to the base member and in spaced parallel relation to the inner side wall member. The base member 95 is shown to be constructed with a top flange that fits into a recess in the inner side wall member and a top flange that fits into a recess in the outer side wall member. A support base 96 is shown supporting the base member 93 and outer side wall member 94 from the support surface 71.

Bolt fasteners 97 are shown extending through the outer side wall member into the base member 93. The side wall members provide spaced upright support surfaces 101 and 102 and the base member provides a base support surface 103 at right angles thereto forming a generally U-shaped surface area for supporting the ribbon being wrapped thereon. Base support surface 103 is parallel to the axis of rotation of the wheel and has a slight curvature in the direction of the wrap as seen in FIG. 24. These support surfaces are coated with a wax prior to wrapping the ribbon thereon and then coated with a glue or adhesive. Side wall member 92 has a series of spaced parallel grooves 104 and side wall has spaced parallel grooves 104 which form spaced ridges of glue in what becomes the top and bottom of the matrix end portions being formed. Each side wall has a deeper groove 106 at the end of the series of grooves and these are oppositely aligned to receive a temporary spacer 108 having notches adjacent the ends so as to slide fit between the grooves and be held thereon. These temporary spacers 108 serve to relieve stress on the fibers and forms a new plane of support for the ribbon as it is wrapped. In the matrix former 73, as the wheel is rotated a thin separator 109 is placed on the base surface 103, reflective glue and a ribbon layer are successively laid down on the base support surface with the side surfaces limiting lateral movement of the ribbon layer. The temporary spacers 108 are placed in the grooves the same time the separator 109 is laid down. After the required number of layers of ribbon and separators and temporary spacers are placed in the ribbon holder portion a clamping cap 111 with a bottom projection 112 is fastened to the top ends of the side wall members as with bolts 113 to clamp the assembled ribbons and separators together and allow the glue to set and cure. Preferably the curing is done in an oven at a temperature of 100-110 degrees F. for about 2.5 hours.

Referring now to FIGS. 16-20 the spaced ribbon former 75 shown includes a flat support plate 121 bolted to the planar support surface 71. The former 75 has a base member 122 with a longitudinal groove 123 in the top surface, two spaced inner side post members 125 and 126 are recessed in vertical grooves in the support plate 121 and extend up from the top along one side of the base member and two spaced outer side post members 127 and 128 extending up from the top along the other side of the base member.

Side post members 125 and 127 are of an identical construction and shape and each has a generally V-shaped groove 131 facing toward the inside of the former to receive, support and locate a circular ear portion 138 on the side of the locator element 132. Side post members 126 and 128 are of an identical construction and shape and each has a larger groove 133 that slidably receives a larger side projection 139 provided along the side of the locator element adjacent one end thereof. The side post also has three smaller grooves 134 spaced from one another which slidably receive three associated spaced ridges 141 formed on the sides of the locator element. The base member and side post member of the spaced ribbon former above described will provide a base support surface extending parallel to the axis of rotation and spaced side support surfaces extending perpendicular to the base support surface which align with corresponding surfaces of the matrix former as above described.

As the wheel is rotated the first locator element 132 with a layer of glue thereon is positioned in the groove 123, and a layer of ribbon is wrapped in the channel of the locator element. Another locator element with glue is positioned on the laid down ribbon which nests into the channel of the first-positioned locator element. Preferably, a quantity of reflective glue is applied to both the top and bottom surfaces of the locator element prior to being positioned in the former.

The spaced ribbon former has a pair of end assemblies 151 and 152 are provided at opposite ends thereof. Each end assembly has an inner plate 153 and an outer plate 154 separated by a bottom plate 155 with the plates being shown fastened to the support plate by bolt fasteners extending therethrough. The inner and outer plates have a series of vertically spaced smaller pin holes 158 a selected distance beyond the end of the former and at equally spaced distances apart that align with one another and each receive a smaller pin 159. The inner and outer plates have a series of vertically spaced larger pin holes 161 a selected further distance beyond the end of the former and spaced further apart than holes 158 at equally spaced distances apart that align with one another and receive a large pin 162. Holes 158 and 161 are at different elevations in relation to the radius of the wheel. The smaller pins are inserted into the small pin holes and then the large pins into the large holes as the stack of ribbon layers and locator elements increases to take the stress off the fibers at the corner of each locator element by reducing the angle that the fiber meets the locator. After several small pins are inserted then a large pin is inserted so that the ribbon will follow a larger radius.

In a full sequence of operation, during each revolution, a dogbone spacer 91 is placed on each ribbon layer in guide 89, a separator 109 and two temporary spacers 108 are placed on each ribbon layer at matrix former 73, a dogbone spacer 91 is placed on each ribbon layer in guide 83, and a locator element 132 is placed on each previously laid down locator element and ribbon layer. Pins 159 and 162 are added in each end assembly 151 and 152 as the stack in the matrix former increases.

When the stack is completed for the matrix former two hollow metal tubes 165 having wax at the ends indicated at 170 are inserted into four of the stacked ear portions of the locator element on each side. A wax plug 164 is inserted into both ends of each of the other stacked ear portions to prevent the glue from flowing therein. A clamping cap 166 with a bottom projection 167 is fastened to the top of the side walls as with bolts 168 to clamp the stack of locator elements and ribbon layers together to form two integral locator bodies. Preferably a teflon sheet 169 is placed between the last ribbon layer and the bottom of the cap to compress the layers. The final assembly as seen in FIG. 21 is cured in an oven as above described.

The glue used in the matrix former and spaced ribbon former preferably is an epoxy that is white in color, reflective to visible light and a hardness of 80-90 durometers and has a relatively high impact resistance.

Refering now to FIG. 25 after the assembly shown in FIG. 21 has been cured the caps 111 and 166 are removed and the formed matrix body 171 and formed spaced ribbon bodies 172 are removed from the separator formers. The formed matrix body 171 is placed in a fixture 175 having a movable base 181 slidable relative to a band saw 182 on a stationary track 183. A pair of support members 185 are mounted on base 181 and are separated to provide a slot 186 through which the band saw will pass. The support members are provided with grooves 187 complementary in shape to those formed on the top and bottom of a formed matrix body 171 centers the matrix body and holds the matrix body during cutting. A fixed support member 188 is mounted on the movable base and supports a spring biased member 189 that is urged against the matrix body when a control lever 190 is set. A vertical band saw blade 182 cuts the matrix body into two identical matrix ends.

The fixture shown in FIGS. 27-29 has a pair of end clamps 191 and 192 with clamp 191 being movable and guided by these guide shafts 199 and associated journals 201 along the side thereof for clamp 191 to be moved relative to clamp 192 to clamp the body 172 to be cut therebetween. The end clamps 191 and 192 are of a similar construction and with reference to end clamp 192 it is divided into two sections 192a and 192b having a vertical slot 195 allowing the band saw blade 198 to pass therethrough. Section 192a has pin projections 193 and 194 on one side of the slot 195 and section 192b has pin projections 196 and 197 on the other side of slot 195.

The purpose of the pin projections is to hold the stacked locator elements in a plane that is parallel to the contacting face of the clamps and perpendicular to the blade for accurate location when cutting the stack so as to obtain two equal and opposite parts. The clamps and clamped body 172 are moved relative to the band saw blade 198 as the band saw blade cuts the body 172 into two identical half-bodies.

An example device so formed has the support surfaces spaced to form a fiber ribbon 1 inch wide and contains 50 fibers each having a diameter of 0.02 inches. The ribbons are spaced apart about 0.10 inches in the formed locator body. The angle of the cut relative to the axis of the fibers is about 9.6 degrees in the spaced ribbon body. The cut end surfaces of the locator body are 6 inches by 6 inches. The cut end surfaces of the matrix body are one inch by one inch.

Although the present invention has been described with a certain degree of particularity, it is understood that the present disclosure has been made by way of example and that changes in details of structure may be made without departing from the spirit thereof.

What is claimed is:

1. In apparatus for making fiber optic light transfer devices, the combination comprising:
   supply means for providing a continuous ribbon of optical fibers,
   ribbon wrapper means including a support member having a planar support surface with ribbon stacking first and second formers mounted on said surface a preselected distance apart and in alignment with one another, and
   drive means to effect relative movement between said supply means and said support member to cause said ribbon having an end attached to said support member to successively wrap about said first former under tension to form successive layers of ribbon and separators in said first former as separators are interposed between each layer of ribbon and successively wrap about said second former alternate layers of ribbon on locator elements as locator elements are interspersed between each layer of ribbon whereby to form a bundle of optical fiber ribbons having two spaced ribbon portions and two matrix portions of two fiber optic light transfer devices, a first guide means to converge the fibers from the spools to a loose ribbon, a second guide means that brings the loose ribbon into a close ribbon and a third guide means that moves up and down and rotates about a transverse horizontal axis to enable the ribbon to follow different wrapping radii.

2. Apparatus as set forth in claim 1 wherein said first guide means includes an upper die and a lower die, said dies being generally channel-shaped with opening in the channels facing one another, there being grooves in said dies to guide the fibers.

3. Apparatus as set forth in claim 1 wherein said second guide means includes an upper die and a lower die, said dies having complementary generally parabolic-shaped surfaces defining a gap through which the ribbon is passed, said dies being mounted on a pivot arm to move up and down.

4. Apparatus as set forth in claim 1 wherein said third guide means includes an upper die, a lower die and spaced side dies, said dies being mounted to pivot about a horizontal axis.

5. In apparatus for making fiber optic light transfer devices, the combination comprising:
   supply means for providing a continuous ribbon of optical fibers,
   ribbon wrapper means including a support member having a planar support surface with ribbon stacking first and second formers mounted on said surface a preselected distance apart and in alignment with one another, and
   drive means to effect relative movement between said supply means and said support member to cause said ribbon having an end attached to said support member to successively wrap about said first former under tension to form successive layers of ribbon and separators in said first former as separators are interposed between each layer of ribbon and successively wrap about said second former alternate layers of ribbon on locator elements as locator elements are interspersed between each layer of ribbon whereby to form a bundle of optical fiber ribbons having two spaced ribbon portions and two matrix portions of two fiber optic light transfer devices,
   said second former having a pair of end assemblies at opposite ends thereof on which the ribbon layer is wrapped to reduce stress on the wrapped fibers by reducing the angles that the ribbon layer meets the locator element, each end assembly having a first series of smaller pin holes supporting smaller pins at a selected distance from the end of the former at different elevations and a second series of pin holes adjacent said first series a further selected distance from the end of the former supporting larger pins at different elevations.

6. In apparatus for making fiber optic light transfer devices, the combination comprising:
   supply means including a plurality of spools to optical fibers with said spools being arranged in two rows on upper and lower frames so the successive spools diverge toward one another in the direction of a downstream discharge end for providing a continuous ribbon of optical fibers,
   a first guide means converge the fibers from the spools to a loose ribbon, a second guide means that brings the loose ribbon into a close ribbon and a third guide means that moves up and down and rotates about a transverse horizontal axis to enable the ribbon to follow different wrapping radii,
   a rotary support wheel having a planar support surface with ribbon stacking first and second formers mounted on said surface a preselected distance apart and in alignment with one another, and
   drive means to rotate said support wheel to cause said ribbon having an end attached to said support wheel to successively wrap about said first former under tension to form successive layers of ribbon and separators in said first former as separators are interposed between each layer of ribbon and successively wrap about said second former alternate layers of ribbon on locator elements as locator elements are interspersed between each layer of ribbon in a weaving sequence whereby to form a bundle of optical fiber ribbons having two spaced ribbon portions and two matrix portions of two fiber optic light transfer devices.

* * * * *